(12) United States Patent
Ho et al.

(10) Patent No.: US 7,286,668 B2
(45) Date of Patent: Oct. 23, 2007

(54) METHOD OF PROTECTING COPYRIGHT OF DIGITAL VIDEO WORK

(75) Inventors: Tai Shui Ho, Taipei Hsien (TW); Shih Kuang Tsai, Taipei Hsien (TW); Jian Feng Tu, Shanghai (CN); Yong Kang Liu, Shanghai (CN); Yan Jin, Shanghai (CN)

(73) Assignee: Inventec Appliances Corp., Taipei Hsien (TW)

( * ) Notice: Subject to any disclaimer, the term of this patent is extended or adjusted under 35 U.S.C. 154(b) by 828 days.

(21) Appl. No.: 10/671,534

(22) Filed: Sep. 29, 2003

(65) Prior Publication Data
US 2005/0069129 A1    Mar. 31, 2005

(51) Int. Cl.
*H04L 9/00* (2006.01)

(52) U.S. Cl. ...... 380/213; 380/212

(58) Field of Classification Search ........ 386/95; 713/176; 380/208, 205, 239, 212, 213, 252
See application file for complete search history.

(56) References Cited

U.S. PATENT DOCUMENTS

| | | | | |
|---|---|---|---|---|
| 4,682,360 A | * | 7/1987 | Frederiksen | 380/212 |
| 5,425,101 A | * | 6/1995 | Woo et al. | 380/212 |
| 5,991,426 A | * | 11/1999 | Cox et al. | 383/100 |
| 6,282,299 B1 | * | 8/2001 | Swanson et al. | 382/100 |
| 6,668,246 B1 | * | 12/2003 | Yeung et al. | 705/57 |

* cited by examiner

*Primary Examiner*—Gilberto Barron, Jr.
*Assistant Examiner*—Thomas M Ho
(74) *Attorney, Agent, or Firm*—Bacon & Thomas, PLLC

(57) ABSTRACT

This invention discloses a method of protecting copyright of a digital video work by using a digital password technology and a digital watermark technology to prevent the unauthorized use of a digital video work. Such method adds password protection of two chrominance arrays of such video work in advance, so that when such video work is published on the Internet, it can only be played in color by a specified player. As long as a user enters the correct password into the specified player, a full color visual effect of such video work can be obtained. If other players are used to play such video work, only a partial gray-scale visual effect can be obtained. Users must request or buy a specific player and a password from the distributor of such video work to play the complete information to prevent piracy.

2 Claims, 2 Drawing Sheets

METHOD OF PROTECTING COPYRIGHT OF DIGITAL VIDEO WORK

BACKGROUND OF THE INVENTION

1. Field of the Invention

The present invention relates to a method of protecting copyright of a digital video work.

2. Description of the Related Art

As the development of digital technology and Internet is blooming, various multimedia digital works (such as graphics, videoconference, and music, etc) are published through networks, so that people can obtain information or download programs from the network very easily. Thus, the copyright protection becomes a big issue that demands immediate attention and requires prompt solutions.

At present, obtaining information via Internet turns out to be a main cause of copyright infringement since the digital video work published on the network can be copied or downloaded, and played by any video player very easily. If these video works are designed to play in a certain specific player, then piracy can be prevented effectively. However, if a video work cannot be played by a general player, it may lose the effect of advertising such video work.

Further, since a digital work can be modified easily, therefore a copyright infringer can change the content of such digital work, and delete the copyrighted information of the original work. Thus, it makes the collection of evidence very difficult. A method must be figured out to disable the playing function once the copyrighted information of the original work is destroyed, or makes it difficult for the copyright infringer difficult to discover or eliminate the copyrighted information of the original work in order to keep a strong evidence of the piracy.

SUMMARY OF THE INVENTION

The primary objective of the present invention is to play a video work published on Internet with a specific player and obtain a full visual effect of such video work, including colors, by entering a correct password into the player. If other players are used to play such work, only a partial gray-scale visual effect can be obtained. Users must request or buy a specific player and a password from the distributor of such video work to display the video work with complete chrominance information, and it thus can prevent piracy. In the meantime, those who have not bought a specific player or a password still can view the gray-scale part of the video work in order to accomplish the advertising effect.

Another objective of the present invention is to install a digital watermark (in textual/graphic form) having a password in the graphic brightness matrix of such video work. The contents of the watermark (in textual/graphic forms) include the copyright information related to such video work, so that when the watermark is added into the video work, the watermark cannot be recognized visually. Such arrangement can prevent a copyright infringer from eliminating the copyrighted information, and thus maintaining a strong evidence of the copyright infringement.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

This invention relates to a method of protecting copyright of a digital video work, which is a method using a digital password technology and a digital watermark technology to prevent unauthorized use of the digital video work of the MPEG-2 format. Such method adds password protection of the two chrominance arrays of such video work in advance, by a first password, so that when such work is published on the Internet, it can be played by a specified player. As long as a user enters a correct second password identical to the first password into the specified player, a full color visual effect of such video work can be obtained. If other players are used to play such work, only a partial gray-scale visual effect can be obtained. Users must request or buy a specific player and a password from the distributor of such video work to recover the complete chrominance information in order to prevent piracy. In the meantime, those who have not bought a specific player or a password still can view the gray-scale part of the video work in order to accomplish the advertising effect.

In this invention, a digital watermark (in textual and/or graphic forms) with a password is added into the graphic brightness matrix of such video work. The contents of the watermark (in textual and/or graphic forms) include the copyright information related to such video work, so that when the watermark is added into the video work, the watermark cannot be recognized visually. Such arrangement can prevent a copyright infringer from eliminating the copyrighted information in order to keep the power evidence of the copyright infringement.

In this invention, the copyright information is also displayed in such video work to act as the first protection for the copyright of such video work.

Figure 1:
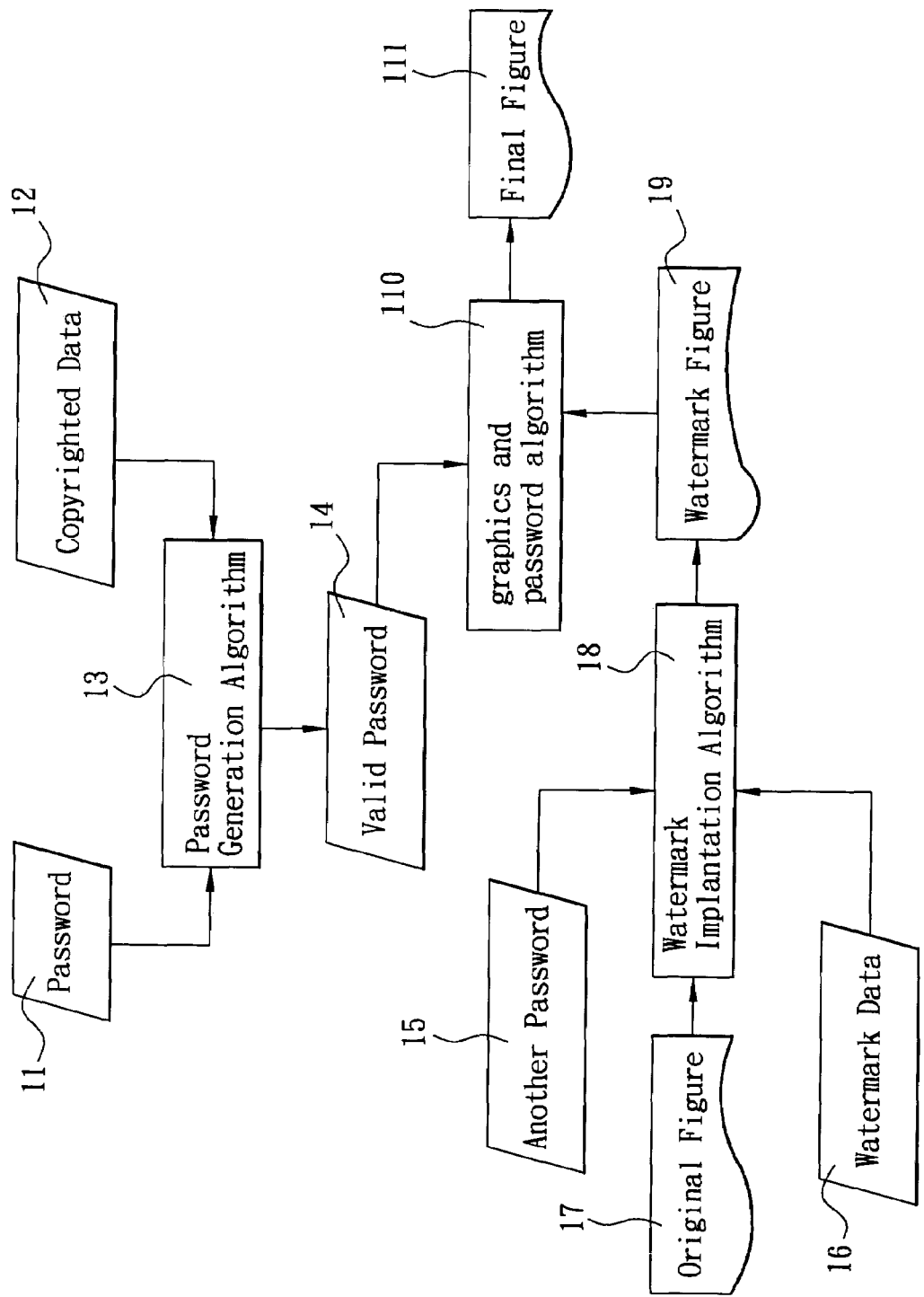
FIG. 1 is a block diagram of setting the password according to the present invention.

Please refer to FIG. 1 for the method of setting password to the video work according to the present invention, which adds the specific copyrighted data 12 into the data fields of the MPEG-2 users, computes the copyright data 12 and a password 11 by a password generation algorithm 13 to obtain a valid password 14, and then computes another password 15, a watermark data 16, an original FIG. 17 by the watermark implantation algorithm 18 to obtain a watermark FIG. 19. Finally, the valid password 14 and the watermark FIG. 19 are computed by the graphics and password algorithm 110 to obtain the final figure 111. The final figure 111 is compressed into the digital video work with MPEG-2 format. In addition, another password 15 is the author's confidential information which will not be disclosed to users, but is just provided for retrieving the watermark.

Figure 2:
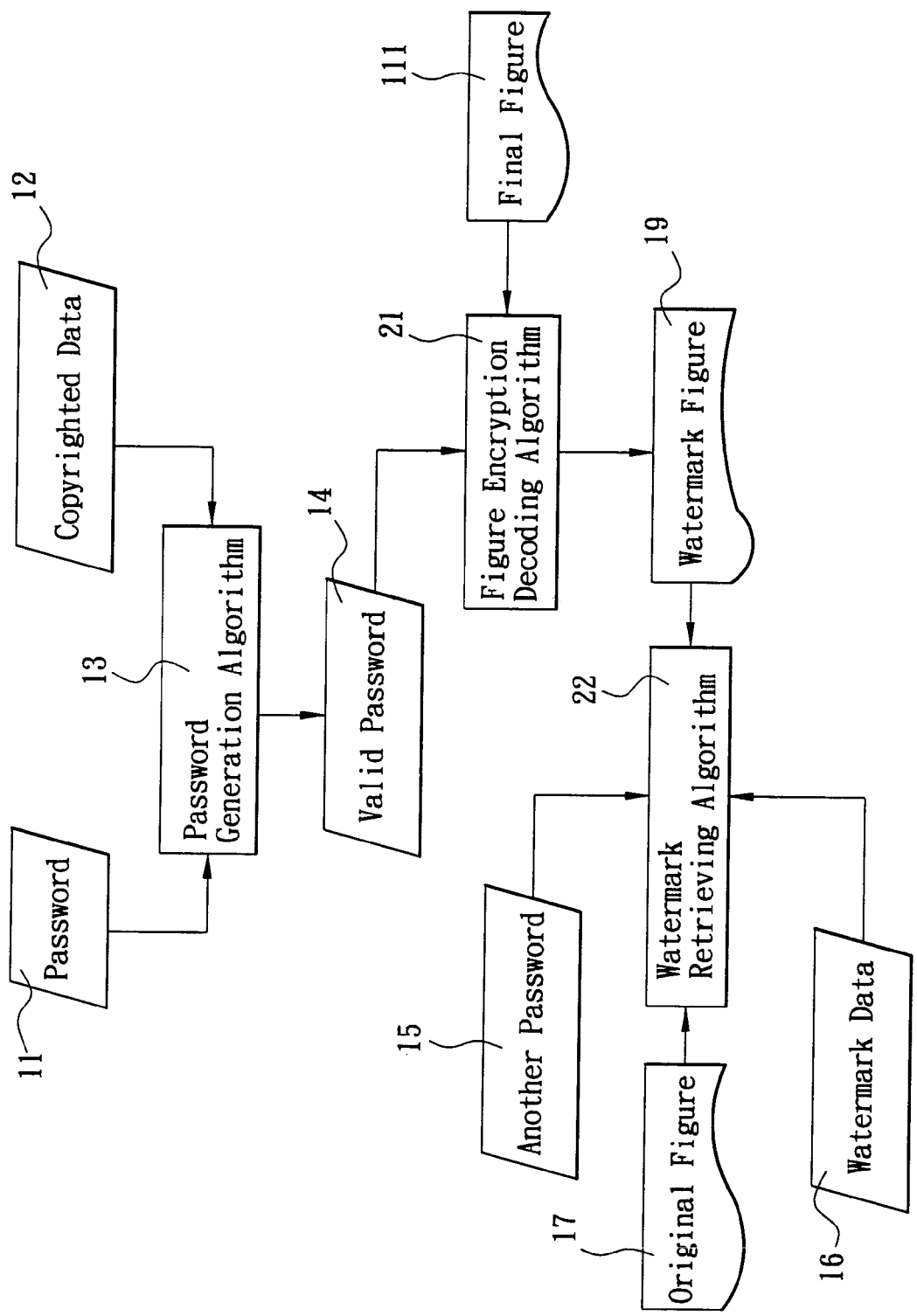
FIG. 2 is a block diagram of releasing the password according to the present invention.

Please refer to FIG. 2 for the method of releasing the password of the video work according to this invention, which computes the original copyright data 12 and the password 11 entered by the user with the password generation algorithm 13 to obtain a valid password 14 required for releasing the final FIG. 111, and then uses the valid password 14 to release the final FIG. 111 by the figure encryption decoding algorithm 21 to obtain a watermark FIG. 19. Therefore, the player can play the complete data of such video work. If the copyright information of such video work is further needed to confirm the copyright of the video work, another password 15, watermark data 16, and original FIG.

17 entered by the author of such video work by the watermark retrieving algorithm 22 in order to obtain the copyright information of such video work.

A series of original figures show up in the process of adding passwords in accordance with this invention, and the process of adding a password to each figure is the same. There are many ways of adding digital watermarks, and the person who wants to add a password may design one's own.

The method of adding a digital watermark into a vector figure will be described below. The brightness component matrix of the figure is fetched first, and then only digital watermark is added to the brightness component matrix. This embodiment takes the example of adding "Copyright2002Long" (the length of watermark is 1) to illustrate how to construct a watermark. Firstly, the ASCII code corresponding to each character is fetched, which is a {0,1} sequence in order. To improve the robustness of the algorithm, the sequence is coded into {−1,1} sequence, and repeat such sequence m times to obtain a sequence {ωi} of a total length of 81 m, and then perform a DCT transformation on the figure and find out the largest di DCT coefficients out from 81 m, and add the watermark after the a linear operation $$\tilde{d}_i = di(1+\alpha\omega i)$$

to the DCT coefficient, wherein the intensity of watermark is controlled by α, and finally perform the IDCT to get the figure with watermark in it. Human eyes cannot distinguish such figure with the original figure. After a series of figures with watermark are obtained, a password can be added to the data of these figures.

The aforesaid procedure did not mention the addition of another password. To add another password, we can use another password to add a digital password to the watermark string (its procedure will not be described here), and then perform the process of constructing watermark.

In order to get the valid password, it is necessary to perform a special password setting computation for the password and the copyrighted data being added when the video data is produced in the process to generate a valid password required for Step 3. There are many ways of adding password, and the password designers may design on their own.

The following example shows a very simple password setting computation. Assume the final valid password is an 8-bit binary number:

```
unsigned char secretch=0;
``` assume the copyrighted data in the video stream is a string of:

```
char * copyrightstr="Sequence+GroupOfPictures+
    Picture";
``` and assume the password string is:

```
char * passwordstr="asdfghjk";
```

After the final valid password is obtained, it can be used to perform the following computations on the above two string:

```
for (i=0; i<strlen(copyrightstr); i++)
    secretch +=copyrightstr[i];
```

-continued

```
for (i=0; i<strlen(passwordstr); i++)
    secretch +=passwordstr[i];
```

After the valid password is obtained from the second step, this password and the two chrominance arrays in the watermark figure obtained from the first step are used to encrypt the figure to obtain the final figure. In such computation process, the grayscale array of the figure will remain unchanged. There are many ways of adding password protection in this procedure, and password designers can design on their own. In the design, the data with password added should not be too large, and the change of data correlation should be minimized to avoid the increase in volume of the following compressed result.

A very simple method of adding a password according to Step 2 of the example is introduced here. Assume that the two color matrixes of the figures are shown as follows:

```
char Cb[m][n]={...};
char Cr[m][n]={...};
```

The algorithm of adding a password is:

```
for (i=0;i<m;i++)
    for (j=0;j<n;j++)
        Cb[i][j] =secretch;
for (i=0;i<m;i++)
    for (j=0;j<n;j++)
        Cb[i][j] =secretch;
```

The last step of the process of adding password protection is to compress the figure sequence obtained by Step 3 according to the MPEG-2 standard, and add the copyrighted data used in Step 2 into the user domain of the MPEG-2 video format. The video format of MPEG-2 is as follows:

```
video_sequence( ) {
    next_start_code( )
    sequence_header( )
    if (nextbits( ) == extension_start_code{
        sequence_extension( )
        do {
            extension_and_user_data(0)
            do {
                if (nextbits( ) == group_start_code){
                    group_of_pictures_header( )
                    extension_and_user_data(1)
                }
                picture_header( )
                picture_coding_extension( )
                extension_and_user_data(2)
                picture_data( )
            } while ((nextbits( ) == picture_start_code)||
                (nextbits( ) == group_start_code))
            if (nextbits( )! = sequence_end_code){
                sequence_header( )
                sequence_extension( )
            }
        } while (nextbits( )! = sequence_end_code)
    } else {
        /*ISO/IEC 11172-2*/
    }
}
``` where, the extension and user data are defined as follows:

```
extension_and_user_data(i){
    while ((nestbits( )==extension_start_code)||
        (nestbits( )==user_data_start_code)){
        if (i!=1)
            if (nextbits( )==extension_start_code)
                extension_data(i)
            if (nextbits( )==user_data_start_code)
                user_data( )
    }
}
``` where, the user_dataO is defined as follows:

```
user_data( ) {
    user_data_start_code
    while (nextbits( )!= '0000 0000 0000 0000 0000 0001'{
        user_data
    }
    next_start_code( )
}
```

The copyrighted data of the digital video work can be added to the user_data. Since there must be an extension_and_user_data(0) and an extension_and_user_data(2) in front of each picture_data( ) but there may not have an extension_and_user_data(1), therefore the copyrighted data can be added into the extension_and_user_data(0) and extension_and_user_data(2) and neglect the extension_and_user_data(1).

In this invention, there are three core algorithms for the three steps of decoding the password, which are individually described in details as follows:

1. Generating a valid password: The procedure of generating a valid password is same as the procedure of adding password, and thus not described here again.

2. Producing a watermark figure: After the valid password is obtained, carry out the reverse process of adding a password and watermark figure to obtain a good visual watermark figure.

3. Retrieving the watermark data: The method of retrieving the digital watermark is different according to the different ways of adding digital watermark.

The method of adding a digital watermark into the encryption and the corresponding method of retrieving the watermark are described below. Firstly, the brightness component matrixes of the watermark figure and the original figure are read, and DCT transformation is performed. Find out the largest $\bar{d}_i$ and di from the 81 m DCT coefficients, and then perform a linear operation according to the step of reversing the procedure in 5.1.1.

$$\omega i = (\bar{d}_{i/di}\_1)/\alpha$$

to obtain a series of $\{\omega i\}$, and a domain value M is set. If $\omega i$ is greater than M, then it is equal to 1; or else it is equal to $-1$. Taking the C8 at the $8^{th}$ position of the character "C" in the watermark "Copyright2002Long" as an example, if the digit number of the mentioned 1 is larger than $-1$, then we expect C8=1, or else C8=0. Similarly, the $7^{th}$, $6^{th}$, ... $1^{st}$ position of the mentioned letter C can be found. The data from each position are combined to get the whole character. At last, all mentioned characters are combined together to obtain the mentioned watermark.

The description above also does not include the watermark password (another password). The way of putting the watermark into action after getting it and the function of watermark are the same as described in the way of adding a password, and thus will not be described here.

What is claimed is:

1. A method of protecting copyright of a digital video work including chrominance and gray-scale data, said chrominance data being arranged in chrominance arrays, comprising the steps of:
    protecting two of said chrominance arrays of said digital video work by a first password;
    entering a second password to a video player;
    reading said digital video work published on the Internet and determining whether the first password for each of said chrominance arrays is identical to said second password in said specified video player;
    playing a complete visual effect of said video work, including colors of said digital work represented by said chrominance data, if said first password is identical to said second password in said video player; and
    playing a partial gray-scale visual effect of said video work if said first password is not identical to said second password.

2. The method of protecting copyright of a digital video work of claim 1, wherein said chrominance data is associated with another password associated with a digital watermark figure/text, and the contents of said watermark figure/text are the copyrighted data of said video work, such that said watermark figure/text is eliminated from said digital video work only when said other password is determined to be identical to said second password by said video player.

* * * * *